United States Patent
Bert

(10) Patent No.: US 9,015,418 B2
(45) Date of Patent: Apr. 21, 2015

(54) SELF-SIZING DYNAMIC CACHE FOR VIRTUALIZED ENVIRONMENTS

(71) Applicant: LSI Corporation, Milpitas, CA (US)

(72) Inventor: Luca Bert, Cumming, GA (US)

(73) Assignee: LSI Corporation, San Jose, CA (US)

( * ) Notice: Subject to any disclaimer, the term of this patent is extended or adjusted under 35 U.S.C. 154(b) by 247 days.

(21) Appl. No.: 13/681,483

(22) Filed: Nov. 20, 2012

(65) Prior Publication Data

US 2014/0143496 A1    May 22, 2014

(51) Int. Cl.
*G06F 12/00*    (2006.01)
*G06F 12/08*    (2006.01)

(52) U.S. Cl.
CPC ........ *G06F 12/0842* (2013.01); *G06F 12/0871* (2013.01); *G06F 2212/1044* (2013.01); *G06F 2212/152* (2013.01); *G06F 2212/222* (2013.01); *G06F 2212/6042* (2013.01)

(58) Field of Classification Search
None
See application file for complete search history.

(56) References Cited

U.S. PATENT DOCUMENTS

2010/0205395 A1    8/2010    Srinivasan
2012/0221765 A1    8/2012    Yoo et al.

OTHER PUBLICATIONS

"Tuning Server Memory"; from Novell website at http://www.novell.com/documentation/nw6p/?page=/documentation/nw6p/smem_enu/data/h9kdb57n.html, 6 pages.

*Primary Examiner* — Midys Rojas
(74) *Attorney, Agent, or Firm* — Suiter Swantz pc llo

(57) ABSTRACT

A method and system for self-sizing dynamic cache for virtualized environments is disclosed. The preferred embodiment self sizes unequal portions of the total amount of cache and allocates to a plurality of active virtualized machines (VM) according to VM requirements and administrative standards. As a new VM may emerge and request an amount of cache, the cache controller reclaims currently used cache from the active VM and reallocates the unequal portions of cache required by each VM. To ensure cache availability, a quick reclamation amount of cache is immediately available to each new VM as it makes the request begins operation. After reallocation, the newly created VM may rely on a guaranteed minimum quota of cache to ensure performance.

20 Claims, 4 Drawing Sheets

| 400 | | |
|---|---|---|
| | 402 | receiving a first cache request from a first VM |
| | 404 | determining an amount of cache available |
| | 406 | determining a first cache allocation based on the first cache request, the amount of cache available, and a VM_quota, the VM_quota determined by an administrator |
| | 408 | allocating to the first VM the first cache allocation |
| | 410 | designating a quick reclamation amount of cache within the first cache allocation |
| | 412 | receiving a second cache request from a second VM |
| | 414 | allocating the quick reclamation amount of cache to the second VM |
| | 416 | negotiating cache requirements between the first VM and the second VM |
| | 418 | determining a second cache allocation based on the second cache request, the amount of cache available, the negotiating, and the VM_quota |
| | 420 | reclaiming a portion of cache from the first VM |
| | 422 | allocating the first VM and the second VM the second cache allocation based on the determining |
| | 424 | designating a quick reclamation amount of cache within the second cache allocation |
| | 426 | receiving an indication that a VM is idle |
| | 428 | determining a third cache allocation based on a number of active VM, the VM_quota, the indication, and the amount of cache available |
| | 430 | reallocating to each one of the number of active VM the third cache allocation |

| | |
|---|---|
| 402 | receiving a first cache request from a first VM |
| 404 | determining an amount of cache available |
| 406 | determining a first cache allocation based on the first cache request, the amount of cache available, and a VM_quota, the VM_quota determined by an administrator |
| 408 | allocating to the first VM the first cache allocation |
| 410 | designating a quick reclamation amount of cache within the first cache allocation |
| 412 | receiving a second cache request from a second VM |
| 414 | allocating the quick reclamation amount of cache to the second VM |
| 416 | negotiating cache requirements between the first VM and the second VM |
| 418 | determining a second cache allocation based on the second cache request, the amount of cache available, the negotiating, and the VM_quota |
| 420 | reclaiming a portion of cache from the first VM |
| 422 | allocating the first VM and the second VM the second cache allocation based on the determining |
| 424 | designating a quick reclamation amount of cache within the second cache allocation |
| 426 | receiving an indication that a VM is idle |
| 428 | determining a third cache allocation based on a number of active VM, the VM_quota, the indication, and the amount of cache available |
| 430 | reallocating to each one of the number of active VM the third cache allocation |

SELF-SIZING DYNAMIC CACHE FOR VIRTUALIZED ENVIRONMENTS

FIELD OF THE INVENTION

The present invention relates generally to allocation of cache for individual virtualized environments (VE). More particularly, embodiments of the present invention relate to dynamic allocation of cache to a plurality of virtualized environments based on a number of VEs requesting a cache allocation and the cache requirements of each specific VE requesting an allocation

BACKGROUND

Increasing demand for cache resources in Solid State Disk (SSD) or flash devices has created a need for efficient use of available cache resources. SSD utilization has increased relative to use of traditional hard drive based on greater SSD speed and reduced SSD size relative to the traditional drives. Some storage solutions may include both a less expensive but more capacious hard drive employed with a smaller but nimble SSD to enhance storage productivity for the overall system. Use of the SSD as cache for the hard drive may further enhance capabilities of the overall system.

In virtualized environments (VE), as each device of a networked system may contain unused resources, a hypervisor may employ a number of operating systems to act in concert to distribute the unused resources of each individual operating system across the whole of the system for efficient use.

Server operations may employ a plurality of virtual machines (VM) operating within a VE. Each VM may have a specific task as desired by the host where the number, objectives, and cache requirements of the VM may routinely change, and dynamically increase or decrease during operation.

In this dynamic environment, one challenge may include how to provide the maximum capabilities to fully perform a system of a variable number of VM with a finite amount of cache available. This greatly variable number of VM may be reliant on the finite amount of available cache for desired performance. The cache hierarchy may include some hard drive (HDD) capacity, some SSD capacity, and method of software caching appropriate for the operating system. Hard drive partitioning may be well-known in the art since physical hard drives have been long established as a functional, albeit cumbersome, storage medium.

Cache is considered a critical resource in SSD based VM operation. Operations performed on the SSD (and performed external to the HDD) may be performed at a fraction of the time as required when performed on the HDD. As a general rule, the higher percentage of code available to the SSD, the faster the operation is performed. Thus, having a maximum amount of SSD cache available to VM may greatly increase the speed with which the VM may perform.

The problem continues unresolved of how to properly and efficiently allocate SSD capacity and to efficiently partition the SSD to give a portion of cache to a dynamic number of VM requesting an allocation.

One solution may include statically portioning a fixed quota of cache to each VM regardless of operational requests. This simple solution has proven greatly inefficient as unused cache may remain idle for extended periods while the associated VM is idle. Also one VM may require more cache than a second VM. While this solution may provide for cache allocation statically assigned at VM creation, it is unable to adapt to VM workload that may change over time.

Another attempt at a solution may include a configuration assuming a static number of VM is known prior to VM cache allocation. This option may fail as well since in many systems, VM may be created and destroyed at will leaving a static amount of cache idle after VM destruction.

Another attempt at a solution may include a plan for the maximum number of VM possible to be supported and allocate that number of cache pools for the associated VM. This solution would also be very inefficient as a number of cache allocations would be created during times when only a small percentage of VM may be present and active, thus wasting valuable cache content for the other allocations. This maximum number solution may further assume the maximum number of VM may be available at startup. Thus, failure of this method is assured since an accurate assumption such as this is rare.

An example of a static allocation may present itself in a virtual desktop infrastructure (VDI) environment. There may be, for example, 10 servers servicing 1,000 VM, an average of 100 VM per server. It may be unknown however, which VM is running on which server or how many VM may be running at each time of day (there may be only 150 at night but all 1,000 during day peak hours). Sizing an allocation of 100 GB of cache for a worst case scenario (when all 1,000 VM may be in operation) would result in a cache allocation of 100 MB per VM. During off peak operation (at night when 850 of the VM may be idle) would leave 85 GB of cache in an idle state when there may be an alternative method to maintain its use. Leaving 850 GB unused would be extremely ineffective and unusable.

Static allocation of cache resources may present post allocation problems as well. For example, in a traditional system, two VM may operate with each VM using 50% of the available cache. At some point in time one of the VM may be very active and need more than its assigned cache allotment and, at the same time, the other VM may be rather idle and need much less of assigned 50% allotment. It could be advantageous for both VM if the first VM could be reallocated more cache during this time than the original 50%. In a traditional statically assigned environment, this reallocation would not be available.

Thus, there remains a need for a system and method for dynamic management of cache assignments to a dynamic number of VM each requesting a variable amount of cache at different times.

SUMMARY

Accordingly, a method for dynamically managing cache assignments to a plurality of virtualized environments comprises: receiving a first cache request from a first VM, determining an amount of cache available, determining a first cache allocation based on the first cache request, the amount of cache available, and a VM_quota, the VM_quota determined by an administrator, allocating to the first VM the first cache allocation, designating a quick reclamation amount of cache within the first cache allocation, receiving a second cache request from a second VM, allocating the quick reclamation amount of cache to the second VM, negotiating cache requirements between the first VM and the second VM, determining a second cache allocation based on the second cache request, the amount of cache available, the negotiating, and the VM_quota, reclaiming a portion of cache from the first VM, allocating the first VM and the second VM the second cache allocation based on the determining, designating a quick reclamation amount of cache within the second cache allocation, receiving an indication that a VM is idle, determining a third cache allocation based on a number of active VM, the VM_quota, the indication, and the amount of cache available, and reallocating to each one of the number of active VM the third cache allocation.

An additional embodiment of the present invention may comprise a computer readable medium having non-transitory computer readable program code embodied therein for dynamically managing cache assignments to a plurality of virtualized environments, the computer readable program code comprising instructions which, when executed by a computer device or processor, perform and direct the steps of: receiving a first cache request from a first VM, determining an amount of cache available, determining a first cache allocation based on the first cache request, the amount of cache available, and a VM_quota, the VM_quota determined by an administrator, allocating to the first VM the first cache allocation, designating a quick reclamation amount of cache within the first cache allocation, receiving a second cache request from a second VM, allocating the quick reclamation amount of cache to the second VM, negotiating cache requirements between the first VM and the second VM, determining a second cache allocation based on the second cache request, the amount of cache available, the negotiating, and the VM_quota, reclaiming a portion of cache from the first VM, allocating the first VM and the second VM the second cache allocation based on the determining, designating a quick reclamation amount of cache within the second cache allocation, receiving an indication that a VM may be idle, determining a third cache allocation based on a number of active VM, the VM_quota, the indication, and the amount of cache available, and reallocating to each one of the number of active VM the third cache allocation.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 4 is a flowchart for a method for self-sizing dynamic cache allocation for virtualized environments in accordance with a preferred embodiment of the present invention.

DETAILED DESCRIPTION

Figure 1:
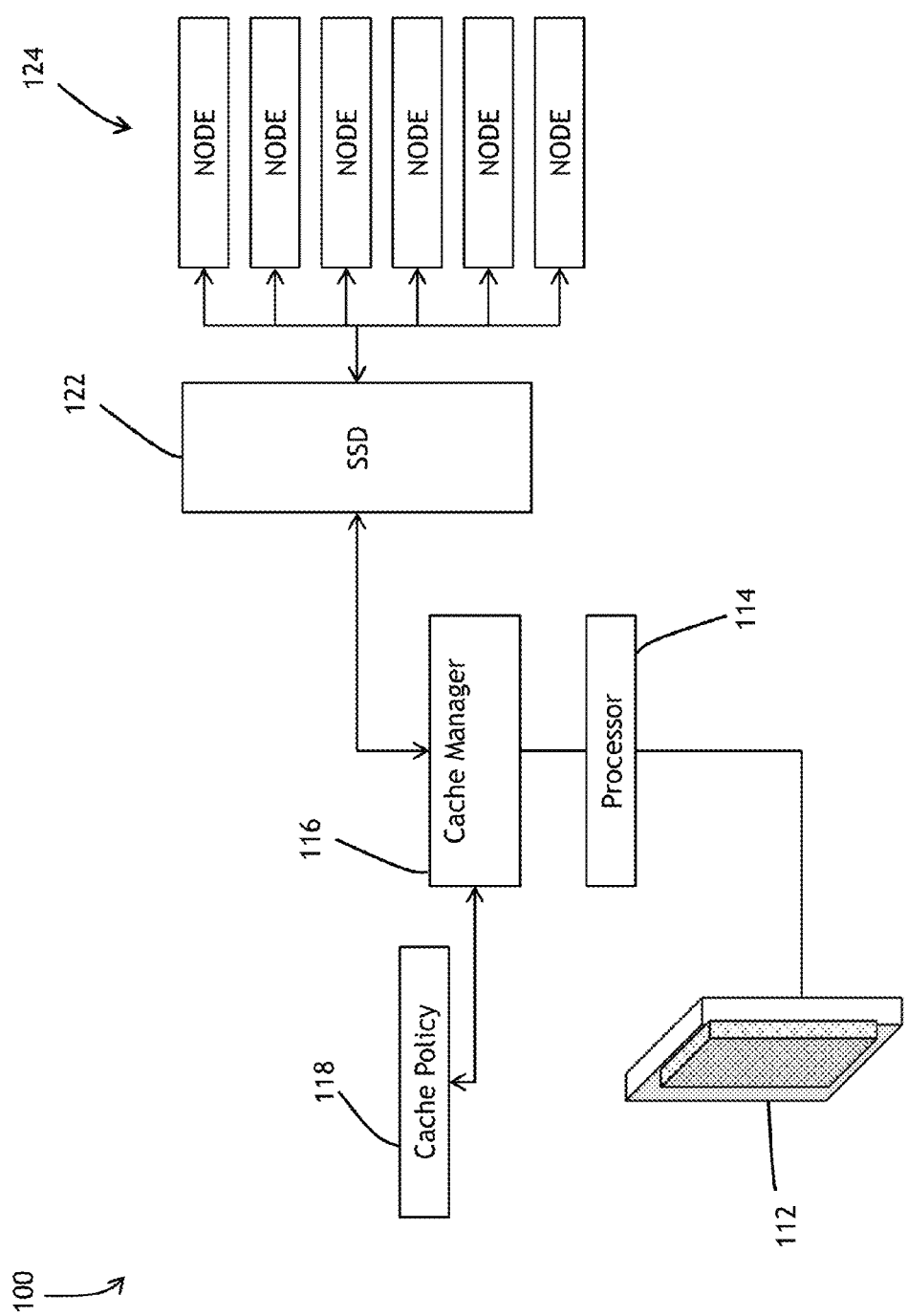
FIG. 1 is a block diagram of a system for self-sizing dynamic cache allocation for virtualized environments in accordance with a preferred embodiment of the present invention.

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

The present invention may address one key critical area of processing: how to cache in the host (CCoH) data pattern coming from a virtualized environment (Hyper-V, VMware, XEN (hypervisor), Kernel-based Virtual Machine (KVM), etc.) where the dynamics of cache management, the nature of VM, their number, mobility and nature present a unique set of challenges.

These challenges may include effective caching on:
- a variable range of VM (from 1 to thousands in the same server),
- variable workloads (some VM can be very active at a specific time, some other VM may be passive, the workload may change at any time),
- unpredictable number of VM due to mobility and locality
- guaranteed bandwidth (amount of cache) for a VM with low Input/Output operations per second (IOPS) rate operating within an environment of high IOPS VM.

Three basic assumptions/parameters require definition:

1) 100% of cache is available to any VM. A first assumption may include a common cache pool where lines (a specific amount) of cache may be allocated to each VM based on VM request. This well-known assumption may follow those tactics used on non-virtualized systems running multiple apps: each VM on a hypervisor is treated the same way as apps on an OS may be treated. By default, each VM (app) may use 100% of the cache pool if no other VM is claiming the space.

2) VM_quota may be defined herein as a parameter that is created either as default for each VM or by the system administrator at VM creation that reflects the minimum guaranteed cache each VM would be able to immediately access on call. Note that this does not mean this space is set aside for each assigned VM as this would still be very inefficient; it is simply a parameter that is used in cache management as described below and that has no direct relationship on how cache lines may be assigned.

3) As used herein, quick reclamation (QR) is defined as a percentage of the VM_quota assigned to each VM that may be instantly reclaimed on demand from the cache manager. One of the drawbacks with a static or quota system is even if the entire amount of cache was set apart for a VM, the VM wouldn't be able to immediately populate it. For example, cache lines may be claimed one by one and populated by the VM on an as-needed basis. Populating an entire cache quota may take minutes or hours. QR is most likely a parameter that will not be user programmable and may also require expert tuning for efficiency based on total cache available. Alternatively, a user programmable QR size may find function in similar situations.

The concept of QR may preferably operate to limit the amount of "dirty" write back cache and allocate an amount of "clean" write through (WT) cache available to a cache manager for immediate reallocation. For example, as cache is used by each currently running VM, the cache manager may make available a certain amount of the used WT cache lines to the QR while limiting the amount of write back cache available.

Within each VM_quota, the QR space is available to the cache controller as a guarantee to a new VM as the new VM may call for cache. Each VM may use the whole of the available cache, however during that use the QR space is designated as the first cache to be reallocated as guaranteed to a newly created VM making a cache request. The QR space may be further defined as a minimum number of WT cache lines guaranteed to a new VM for immediate reallocation as the WT lines may be immediately evicted without a long write back process.

Cache lines may be available on a global scale accessible to each system VM which may request the cache. Thus, efficient use of the whole of the cache may be possible among a variety of numbers, sizes, and requirements of VM making the request. Each VM may potentially take advantage of 100% of the cache size while any dynamic number of VM may emerge or destruct as operation may dictate.

Referring to FIG. 1, a block diagram of a system for self-sizing dynamic cache allocation for virtualized environments in accordance with a preferred embodiment of the present invention is shown. A VM may operate as requested from an operator on a terminal 112. System 100 may include a processor 114. Cache manager 116 may provide direction for each line of cache and on which node 124 a VM may operate. Cache manager 116 must operate within a cache policy 118 as set by an administrator. SSD 122 may comprise the whole of the cache available to system 100 for allocation to each VM.

As each VM becomes active, it may be guaranteed to receive the VM_quota from the cache manager upon request. The immediate guarantee of the VM_quota allows each VM a minimum amount of cache upon VM startup. During VM startup, a priority is given to the startup VM for the VM_quota is has requested.

Preferably, the VM_quota may be comprised of WT cache lines from one or more QR spaces immediately available for the newly created VM. However, on occasion the VM_quota may also contain some write back lines requiring extra time to write back before eviction.

In operation, a cache manager may preferably perform dynamic allocation of cache resources for a plurality of VM. A first VM may receive the whole of the cache available if the first VM is the only VM requesting cache. In the first allocation, the cache manager may designate a portion of the first allocation of cache as the QR space. As a second VM may emerge and make a request for cache, the cache manager reclaims the QR cache from the first VM and gives the guaranteed QR cache as the VM_quota to the second VM. As the cache manager then may analyze the existing cache request from the first VM and the existing cache request from the second VM, is reallocates the cache to each of the VM based on each request.

Figure 2:
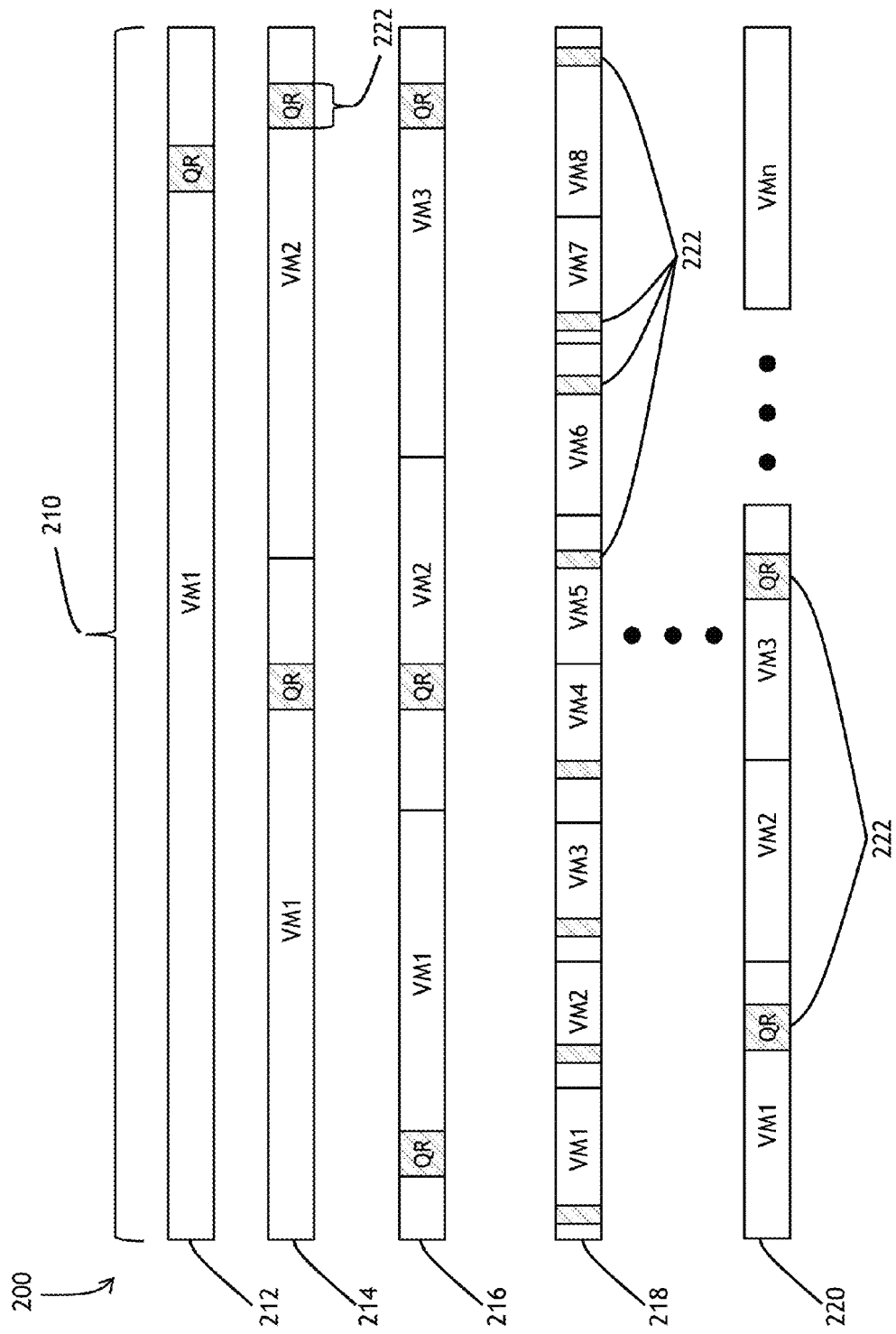
FIG. 2 is a time step diagram of a method for self-sizing dynamic cache allocation for virtualized environments in accordance with a preferred embodiment of the present invention.

Referring to FIG. 2, a time step diagram of a method for self-sizing dynamic cache allocation for virtualized environments in accordance with a preferred embodiment of the present invention is shown. Method 200 may include a finite amount of cache 210 as the entire cache allocation to a system. As a first VM1 may become active at time step 212, the system 100 may allocate 100% of the cache 210 to VM1. Also after VM1 activation, system 100 may designate a portion of the VM1 cache allocation as QR space for a possible reallocation to a future new VM. At time step 214, a newly created VM2 becomes active and is allocated an amount of cache for operation. Again, once the reallocation is complete, VM1 and VM2 must follow cache policies 118 and designate QR space for any new VM.

At time step 216 three VM are now active with each VM designated space for QR to a newly anticipated VM. At time step 218, an exemplary eight VM are active, each with a designated amount of QR space 222.

In one embodiment of the present invention, each of the plurality of VM (VM1-VM8) may not be required to designate QR space 222 for an anticipated new VM. Should the cache policy 118 require a specific amount of QR space 222, a smaller number of VM than the entire number of active VM may be required to designate QR space 222. For example, in this case, VM1, VM3, and VM5 may be the only active VM required to designate QR space 222. The remaining VM (VM2, VM4, VM6, VM7, and VM8) could be free to operate without a QR requirement.

At time step 220, there are an n number of VM active with an associated lesser number of VM required to maintain QR space 222.

The rate of reallocation from a QR must balance with the rate of request for the newly created VM. A designer may programmatically balance the rate of cache line allocation with the rate of cache line requirements by the newly created VM. A correct balance of write back and write through, write cache and read cache may enable the cache manager to properly allocate cache lines based on VM need.

One method of balance may include read cache only, where the cache manager may not cache any write cache. In this case QR would be available for an immediate release since the read cache is immediately available.

After the second allocation, the cache manager must preferably make available to a new VM its VM_quota from each of the existing VM in operation. The cache manger designates QR cache from each of the existing VM allocations as QR cache ready to be reallocated to a new VM once a request is made by the new VM. The cache manager then may preferably aggregate the QR cache from each of the operating VM to provide enough VM_quota for the newly created VM to begin operation. Once operational, the cache manager may then preferably reallocate among the operating VM, all the available cache.

Figure 3:
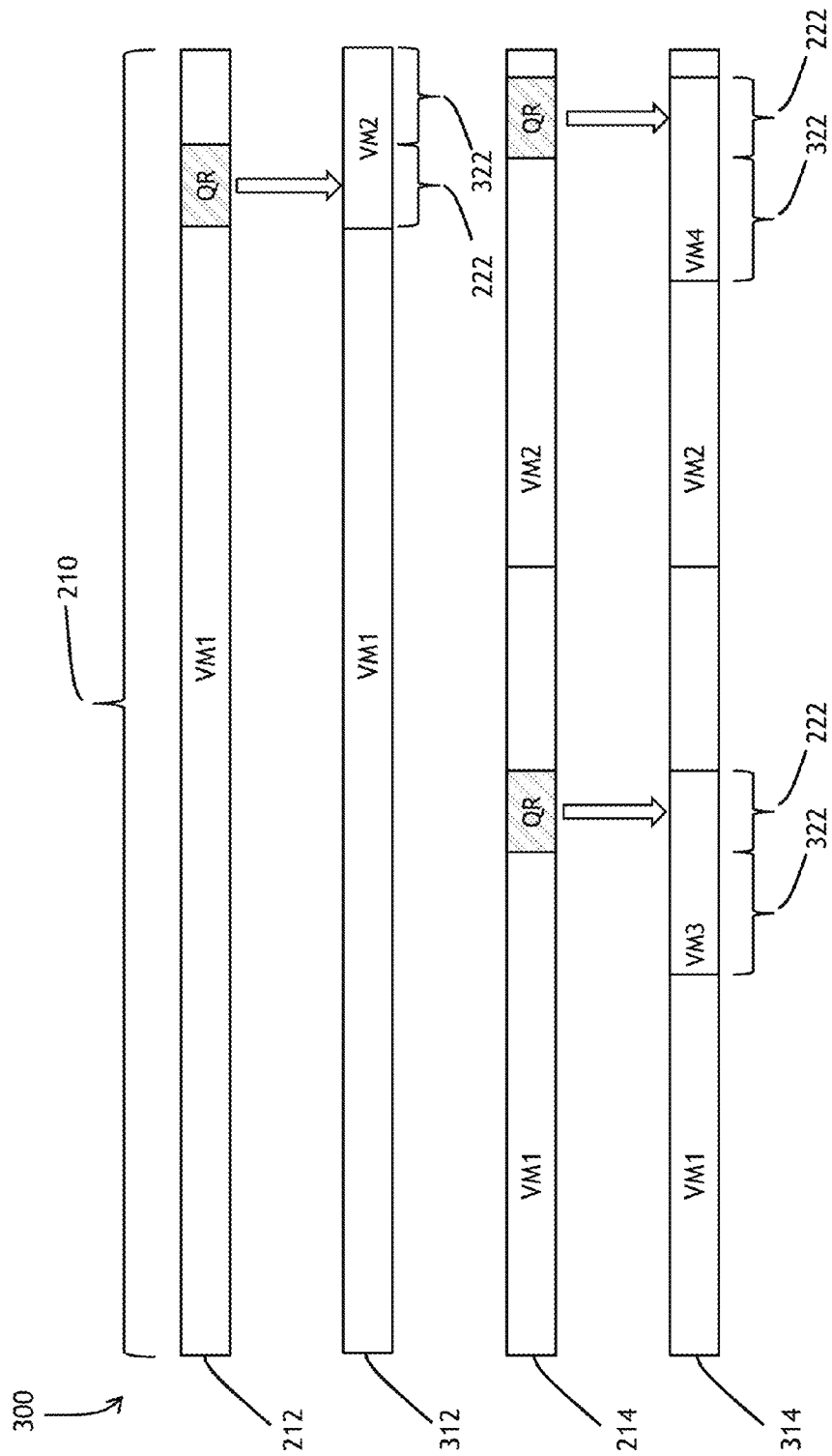
FIG. 3 is a detailed time step diagram of a method for self-sizing dynamic cache allocation for virtualized environments in accordance with a preferred embodiment of the present invention.

Referring to FIG. 3, a detailed time step diagram of a method for self-sizing dynamic cache allocation for virtualized environments in accordance with a preferred embodiment of the present invention is shown. Method 300 may include an intermediate time step 312 not shown in FIG. 2. As before, a finite amount of cache 210 may be the entire cache allocation to a system. Time step 212 may indicate VM1 as the only active VM and receiving 100% of the cache 210. As VM2 becomes active at time step 312, VM2 may be immediately guaranteed the QR space 222 allocated during time step 212. This immediate guarantee may allow VM2 the required amount of startup cache to begin operation. Additionally, VM2 may be guaranteed a priority in receiving VM_quota 322 as VM2 begins operation. After reallocation at step 214, VM1 has its allocation and VM2 does as well. Each of the operating VM also designating a portion of cache to QR space 222. At time step 314, as VM3 and VM4 become active, an immediate transfer of cache from the QR space 222 is the guarantee for each to begin operation as well as a priority of VM_quota 322 given to each new VM.

An exemplary illustration may describe the preferred embodiment in a manner more easily understood.

A preferred embodiment of the present invention may allocate an exemplary 100 GB of total available cache 210 to each of the VM in operation, and a VM_quota 322 as set by an administrator as 10% of total or 10 GB. As a first VM1 is created 212, given VM1 is the only VM in the system, it will be allocated and use 100% of the cache (100 GB) as it may require. At a later time 312 a second VM2 becomes operational and VM2 has a 100% VM_quota 322 meaning it requires 100% of the 10 GB VM_quota 322 made available by the administrator. Assuming QR 222 has been set as 5% of quota. This follows that the VM_quota is 10 GB (10% of 100 GB) and the QR space 222 is 500 MB (5% of the VM_quota 10 GB).

Upon the above VM2 creation at time stamp 312, even if VM2 is inactive, the cache controller will allow VM1 to use all 100 GB, but will force at least 500 MB of it to be clean WT for immediate availability QR 222 for VM2. If at any time the new VM2 requires cache, it may rely on 500 MB immediately available, and the balance of 10 GB allocated as VM_quota 322 with a priority. After VM2 is operational at time stamp 214, the cache controller may negotiate cache allocation based on caching policies with each VM in operation. The VM which requires cache most (VM1, FIG. 3) will be allocated most of the available space.

Preferably, embodiments of the present invention may provide dynamic allocation of available cache where boundary cases may preset a specific challenge. For example, if VM1 is very active and VM2 is idle, VM1 may reclaim 100% of the cache from a periodic reallocation, with the minor limitation that a very small part (500 MB or 0.5%) will need to be designated as QR WT cache for VM2 use or a potential VM3. If VM2 becomes active, and may have very few input output (IO) operations but require very low latency, VM2 may be able to count immediately on the 500 MB assigned by overwriting VM1 data. VM2 may then be able to count on up to 10 GB as defined by allocation policies freed by the cache manager. After this reallocation, the method must keep 500 MB available at all times to support the QR requirement (i.e. more VM1 or VM1 and VM2 data will turn WT to maintain the required QR quota).

A final exemplary embodiment may include a complex case of a large installation, running 10 severs, each server with up to 100 VM. Each VM maintains no knowledge of on which server each VM will run. Continuing with the above parameters, with the only difference of assigning 1 TB cache per node as a more appropriate value for the configuration.

Thus, one example may include:
10 nodes 124
1 TB cache/node
An average of 100 VM/node while any VM may operate on any node
10 GB VM_quota 322 each VM
0.5 GB (500 MB) QR space 222

In this example, any VM, on any node, may compete for any space needed. Under one set of caching policies of the present invention, each node would need to keep 0.5 MB*1,000 VM=500 GB in WT for the required QR space 222. This would be a highly inefficient method of maintaining QR availability for a potential new VM. One embodiment of the present invention may allow for caching policies requiring only a pool of WT space available for any new VM requiring QR space 222. If an average is 10 VM, the embodiment may allow for keeping just 10*0.5 GB=5 GB WT available on each node. Therefore, each new VM may be allocated QR cache from the pool. In practice, any new VM may run on any node, and newly created VM will draw from the common pool of QR space reserved for each of them.

It is further contemplated that if more VM are newly created, (i.e. average 10 VM may also mean that at some time there may be 15 VM operating on a node). One solution may include an instantiation of a spare pool of VM available for implementation on short notice.

Referring to FIG. 4, a flowchart for a method for self-sizing dynamic cache allocation for virtualized environments in accordance with a preferred embodiment of the present invention is shown. A method 400 for dynamically managing cache assignments to a plurality of virtualized environments comprises: at step 402, receiving a first cache request from a first VM, at step 404 determining an amount of cache available, at step 406 determining a first cache allocation based on the first cache request, the amount of cache available, and a VM_quota, the VM_quota determined by an administrator, at step 408 allocating to the first VM the first cache allocation, at step 410 designating a quick reclamation amount of cache within the first cache allocation, at step 412 receiving a second cache request from a second VM, at step 414 allocating the quick reclamation amount of cache to the second VM, at step 416 negotiating cache requirements between the first VM and the second VM, at step 418 determining a second cache allocation based on the second cache request, the amount of cache available, the negotiating, and the VM_quota, at step 420 reclaiming a portion of cache from the first VM, at step 422 allocating the first VM and the second VM the second cache allocation based on the determining, at step 424 designating a quick reclamation amount of cache within the second cache allocation, at step 426 receiving an indication that a VM is idle, at step 428 determining a third cache allocation based on a number of active VM, the VM_quota, the indication, and the amount of cache available, and at step 430 reallocating to each one of the number of active VM the third cache allocation.

CONCLUSION

Specific blocks, sections, devices, functions, processes and modules may have been set forth. However, a skilled technologist will realize that there may be many ways to partition the method and system, and that there may be many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the method and system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims may be to be embraced within their scope.

In the present disclosure, the methods disclosed may be implemented as sets of instructions or software readable by a device. Further, it is understood that the specific order or hierarchy of steps in the methods disclosed may be examples of exemplary approaches. Based upon design preferences, it is understood that the specific order or hierarchy of steps in the method can be rearranged while remaining within the disclosed subject matter. The accompanying claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for dynamically managing cache assignments to a plurality of virtualized environments, the method comprising:
receiving a first cache request from a first Virtual Machine (VM);
determining an amount of cache available;
determining a first cache allocation based on the first cache request, the amount of cache available, and a Virtual Machine Quota (VM_quota), the VM_quota determined by an administrator;
allocating the first cache allocation to the first VM;
designating a quick reclamation amount of cache within the first cache allocation;
receiving a second cache request from a second VM;
allocating the quick reclamation amount of cache to the second VM;
negotiating cache requirements between the first VM and the second VM;
determining a second cache allocation based on the second cache request, the amount of cache available, the negotiating, and the VM_quota;
reclaiming a portion of cache from the first VM;
allocating the second cache allocation to each of the first VM and the second VM based on the determining;
designating a quick reclamation amount of cache within the second cache allocation;
receiving an indication that a VM is idle;
determining a third cache allocation based on a number of active VM, the VM_quota, the indication, and the amount of cache available; and
reallocating the third cache allocation to each one of the number of active VM.

2. The method for dynamically managing cache assignments to a plurality of virtualized environments of claim 1, wherein the plurality of virtualized environments further comprises one of a virtual machine, a virtual entity, a non-virtual machine, and a non-virtual entity.

3. The method for dynamically managing cache assignments to a plurality of virtualized environments of claim 1, wherein receiving a first cache request from a first VM further comprises a request for a specific amount of cache.

4. The method for dynamically managing cache assignments to a plurality of virtualized environments of claim 1, wherein determining an amount of cache available further comprises an analysis of a plurality of nodes, the analysis including at least one of: a Solid State Disk (SSD) health, a Hard Disk Drive (HDD) health, and connectivity.

5. The method for dynamically managing cache assignments to a plurality of virtualized environments of claim 1, wherein determining a first cache allocation further comprises a determination based on a number of VM requesting the first allocation, whether the requests are equal or unequal, and each VM requested amount.

6. The method for dynamically managing cache assignments to a plurality of virtualized environments of claim 1, wherein the VM_quota determined by an administrator further comprises a VM_quota determined by a cache policy and a VM_quota determined by a cache manager.

7. The method for dynamically managing cache assignments to a plurality of virtualized environments of claim 1, wherein designating a quick reclamation amount of cache within the second cache allocation further comprises designating a finite amount of quick reclamation space not dependent on the number of active VM.

8. The method for dynamically managing cache assignments to a plurality of virtualized environments of claim 1, wherein receiving an indication that a VM is idle further comprises one of: an indication that a VM is idle for a period, an indication that a VM requires less than the VM_quota, an indication that a VM requires more than the VM_quota, and an indication that a VM is destructed.

9. The method for dynamically managing cache assignments to a plurality of virtualized environments of claim 1, wherein the number of active VM further comprises all VM that are not considered idle.

10. The method for dynamically managing cache assignments to a plurality of virtualized environments of claim 1, wherein reallocating to each one of the number of active VM the third cache allocation further comprises a periodic reallocation based on the number of active VM, the VM_quota, the indication, and the amount of cache available.

11. A non-transitory computer readable medium having non-transitory computer readable program code embodied therein for dynamically managing cache assignments to a plurality of virtualized environments, the computer readable program code comprising instructions which, when executed by a computer device or processor, perform and direct the steps of:
receiving a first cache request from a first Virtual Machine (VM);
determining an amount of cache available;
determining a first cache allocation based on the first cache request, the amount of cache available, and a Virtual Machine Quota (VM_quota), the VM_quota determined by an administrator;
allocating the first cache allocation to the first VM;
designating a quick reclamation amount of cache within the first cache allocation;
receiving a second cache request from a second VM;
allocating the quick reclamation amount of cache to the second VM;
negotiating cache requirements between the first VM and the second VM;
determining a second cache allocation based on the second cache request, the amount of cache available, the negotiating, and the VM_quota;
reclaiming a portion of cache from the first VM;
allocating the second cache allocation to each of the first VM and the second VM the based on the determining;
designating a quick reclamation amount of cache within the second cache allocation;
receiving an indication that a VM may be idle;
determining a third cache allocation based on a number of active VM, the VM_quota, the indication, and the amount of cache available; and
reallocating the third cache allocation to each one of the number of active VM.

12. The computer readable medium of claim 11, wherein the plurality of virtualized environments further comprises one of a virtual machine, a virtual entity, a non-virtual machine, and a non-virtual entity.

13. The computer readable medium of claim 11, wherein receiving a first cache request from a first VM further comprises a request for a specific amount of cache.

14. The computer readable medium of claim 11, wherein determining an amount of cache available further comprises an analysis of a plurality of nodes, the analysis including at least one of: a Solid State Disk (SSD) health, a Hard Disk Drive (HDD) health, and connectivity.

15. The computer readable medium of claim 11, wherein determining a first cache allocation further comprises a determination based on a number of VM requesting the first allocation, whether the requests are equal or unequal, and each VM requested amount.

16. The computer readable medium of claim 11, wherein the VM_quota determined by an administrator further comprises a VM_quota determined by a cache policy and a VM_quota determined by a cache manager.

17. The computer readable medium of claim 11, wherein designating a quick reclamation amount of cache within the second cache allocation further comprises designating a finite amount of quick reclamation space not dependent on the number of active VM.

18. The computer readable medium of claim 11, wherein receiving an indication that a VM is idle further comprises one of: an indication that a VM is idle for a period, an indication that a VM requires less than the VM_quota, an indication that a VM requires more than the VM_quota, and an indication that a VM is destructed.

19. The computer readable medium of claim 11, wherein the number of active VM further comprises all VM that are not considered idle.

20. The computer readable medium of claim 11, wherein reallocating to each one of the number of active VM the third cache allocation further comprises a periodic reallocation based on the number of active VM, the VM_quota, the indication, and the amount of cache available.

* * * * *